United States Patent [19]

Uratani

[11] 4,101,755

[45] Jul. 18, 1978

[54] AUTOMATIC ARC WELDER

[75] Inventor: Takafumi Uratani, Osaka, Japan

[73] Assignee: Osaka Transformer Co., Ltd., Osaka, Japan

[21] Appl. No.: 765,406

[22] Filed: Feb. 3, 1977

[30] Foreign Application Priority Data

| Feb. 13, 1976 | [JP] | Japan | 51-15015[U] |
| Feb. 13, 1976 | [JP] | Japan | 51-15016[U] |
| May 14, 1976 | [JP] | Japan | 51-60103[U] |

[51] Int. Cl.² ............................................. B23K 9/12
[52] U.S. Cl. ......................... 219/124.31; 219/124.33; 219/137 R; 228/45
[58] Field of Search .............. 219/124, 125 R, 137 R; 228/45

[56] References Cited

U.S. PATENT DOCUMENTS 3,764,777  10/1973  Sakabe .......................... 219/125 R Primary Examiner—E. A. Goldberg

[57] ABSTRACT

The present disclosure relates to an automatic arc welder for welding two metal plates together along a line of joint formed between the two metal plates. The welder has a welding unit including a welding torch mounted on a carrier member for performing the welding as the carrier member travels along the line of joint. Since the welding unit is rotatably supported on a frame member, while the frame member is pivotally mounted, through a suitable bracket, on the carrier member, the positioning of the welding torch can be varied with respect to different types of weldings.

23 Claims, 22 Drawing Figures

AUTOMATIC ARC WELDER

The present invention relates to a welding machine, and more particularly to an automatic arc welder which is suitable for welding a joint as the welder travels along a line of weld and is applicable to wide use through a rearrangement of a welding torch to be directed to the line of weld.

In welding, especially in continuous welding along a joint, i.e., the line formed between two work pieces to be welded, the positioning and the setting angle of the welding torch with respect to the situations and arrangement of the two work pieces largely affect the conditions of the welded portions. When the joint is formed by two plain metal plates with their side edges facing each other, the welding torch should preferably be positioned adjacent to and directly towards the joint in such a manner that, when the metal plates are placed on a plain surface side by side, the tip portion thereof should be downwardly directed towards the joint, or in such a manner that, when the two metal plates are erected with one plate on top of the other, the tip portion thereof should be horizontally directed towards the joint. The former welding is referred to as flat positioned welding, while, on the other hand the latter welding is referred to as horizontal welding, hereinbelow.

On the other hand, when the joint is formed by two plain metal plates, i.e., a horizontal metal plate placed on a flat surface and a vertical metal plate erected over the horizontal metal plate in a manner to form a shape of inverted "T", the welding torch should preferably be positioned adjacent to the joint and in an aiming angle, i.e., the angle formed between an axis of the welding torch and the face of the horizontal metal plate, for example in one case, of approximately 35°. Such welding as described above is referred to as non-positioned fillet welding, hereinbelow.

Therefore, in order to perform the various weldings such as non-positioned fillet welding, flat positioned welding or horizontal welding as described above with one welder, it is necessary to exchange a welding unit having components such as an electrode wire feeding device and the welding torch, or to exchange a supporting bracket mounted on a carrier member for supporting the welding unit, or it is necessary to rearrange the positioning of such welding unit, so as to alter the positioning and aiming angle of the welding torch as the type of welding is changed. Such exchange and rearrangement not only takes much time, but also often requires skilled technique. Furthermore, in the case where it is necessary to exchange the welding unit or the supporting bracket, a spare welding unit or a spare supporting bracket which is not in use must be reserved for use, thus resulting in an inefficiency in the maintenance of such type of welder.

Accordingly, there have been desires and wants for an improved type of an automatic arc welder which is capable of positioning with easy operation the welding torch, as well as the wire feeding device in optimum positions for each type of welding, without having any operations for exchange of the components for the automatic arc welder.

According to one type of conventional automatic arc welder, there is provided a slit in a form of arc in the bracket or supporting frame for displacing the welding unit along the slit. For example, when it is necessary to carry out one type of welding, the welding unit is slided along the slit to its one end and is fixedly supported thereat upon tightening of a clamping means coupled to the welding unit, while, on the other hand, when it is necessary to carry out another type of welding, the welding unit is slidingly shifted along the slit to a different place, for example, to its other end and is again fixedly supported thereat upon tightening of the clamping means.

However, in the above described type of automatic arc welder, it is apparent that the bracket itself will become comparatively large in size as the slit becomes longer for making it possible for the welding unit to perform various types of weldings.

In addition, there is such a disadvantage that the automatic arc welder with such large bracket can not be positioned in a narrow space and that the large bracket may put the welding portion out of an operator's sight.

Another type of conventional automatic arc welder has incorporated therein a suitable rotating mechanism and a linkage mechanism for directing the welding torch to various positions. However, in this type of automatic arc welder, the mechanisms thereof are comparatively complicated in the structure with low allowances, while occupying large spaces, thus resulting in high cost in manufacturing.

Therefore, a primary object of the present invention is to present an improved type of automatic arc welder having a number of adjusting means for adjusting the position of the welding torch in various directions through an easy operation, so as to carry out the different types of weldings as described before.

Another object of the present invention is to present the above described type of an automatic arc welder which is compact in size.

A further object of the present invention is to present the above described type of an automatic arc welder which is capable of traveling in parallel relation to the line of weld.

The automatic arc welder of the present invention comprises a vehicle or carrier member provided with at least three wheels coupled with driving means for traveling along the line of weld, a first bracket mounted on the carrier member, a second bracket pivotally supported at end portion of said first bracket, a first clamping means for tightly clamping the second bracket on the first bracket at a suitable rotated position, a welding unit rotatably provided with respect to the second bracket and including electrode wire feeding means for continuously feeding, during operation of the automatic arc welder, the electrode wire towards a portion to be welded and welding torch for directing the electrode wire towards the portion to be welded and a second clamping means for clamping the welding unit in a position with respect to the second bracket.

In the automatic arc welder having such structure as described above, the height of the welding unit is determined by the rotated position of the second bracket with respect to the first bracket and the aiming angle of the welding torch is determined by the rotation of the welding unit with respect to the second bracket. For the purpose of precise adjustment in positioning of the welding torch, there is provided a sliding means between the carrier member and the first bracket for slidingly displacing the first bracket in a direction perpendicular to the movement of the welder and also a length adjusting means for adjusting the length of the welding torch in an axial direction of the welding torch.

The automatic arc welder of the present invention is further provided with guiding means such as a track composed of a pair of rails for guiding the travel of carrier member, i.e., the welder along the line of weld in parallel relation thereto.

Accordingly, the automatic arc welder of the present invention can be arranged in a simple manner to having the welding torch positioned suitable for one welding such as non-positioned fillet welding, while, in turn, through a similar manner, the welding torch is rearranged in another position suitable for a different type of welding such as flat positioned welding.

Furthermore, the welder of the invention is compact in size and is simple in structure, thus it can be easily manufactured without high cost.

These and other objects and features of the present invention will become apparent from the following descriptions taken in conjunction with preferred embodiments thereof with reference to the accompanying drawings, wherein.

Figure 1:
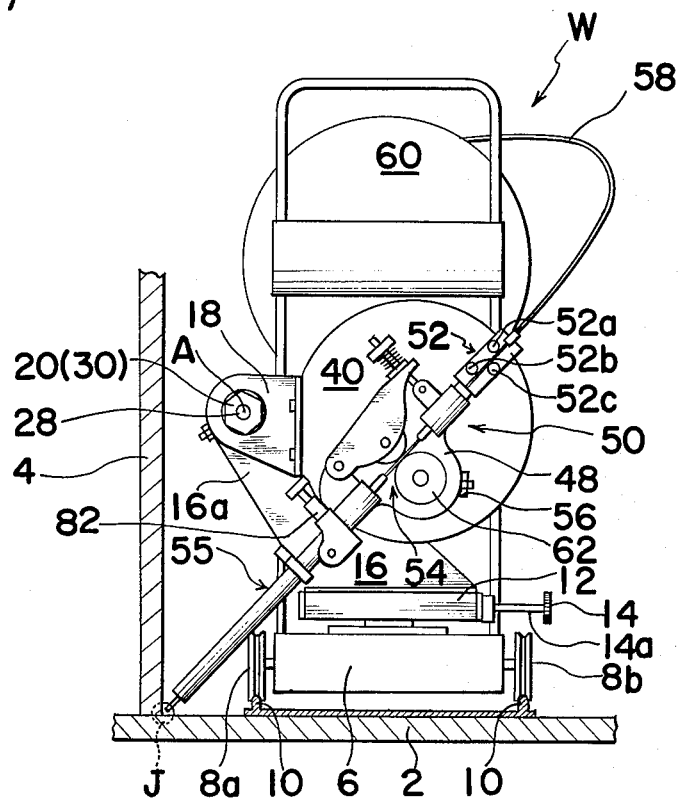
FIG. 1 is a front view of the automatic arc welder of the present invention.
Figure 3:
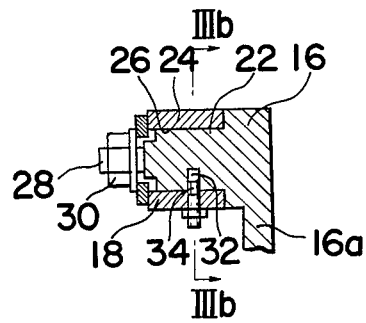
FIG. 3(a) is a cross sectional view taken along a line IIIa—IIIa of FIG. 2.
FIG. 3(b) is a cross sectional view taken along a line IIIb—IIIb of FIG. 3(a)
Figure 3:
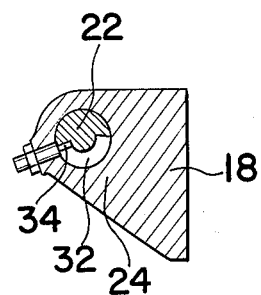
Figure 11:
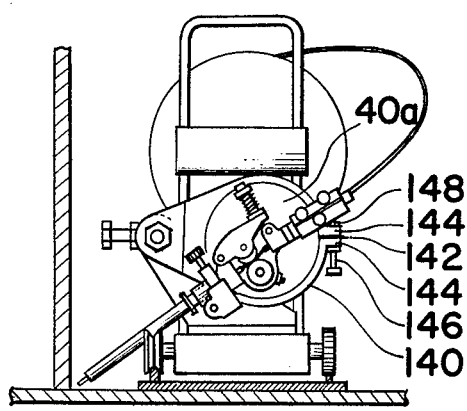
Figure 12:
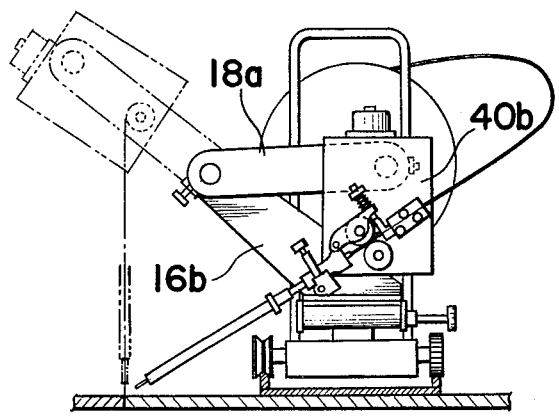
Figure 13:
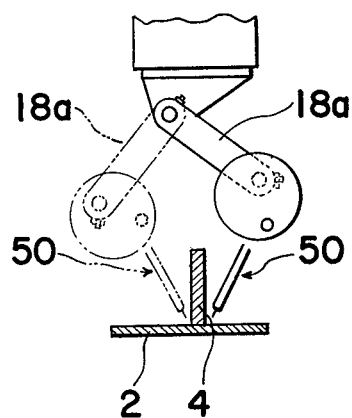

FIGS. 7(a), 7(b), 8(a), 8(b), 9(a), 9(b), 10(a) and 10(b) are similar view to FIGS. 3(a) and 3(b) respectively, but particularly show modification thereof;

FIGS. 11 and 12 are similar view to FIG. 1, but particularly show further embodiments thereof; and FIG. 13 is a schematic elevational view of the automatic arc welder of the present invention partly broken and particularly showing one method of welding which is applicable thereto.

In describing the preferred embodiment of the present invention illustrated in the drawings, specific terminology will be resorted to for the sake of clarity. However, it is not intended to limit to the specific terms so selected, and it is to be understood that each specific term includes all technical equivalent which operate in a similar manner to accomplish a similar purpose.

Figure 2:
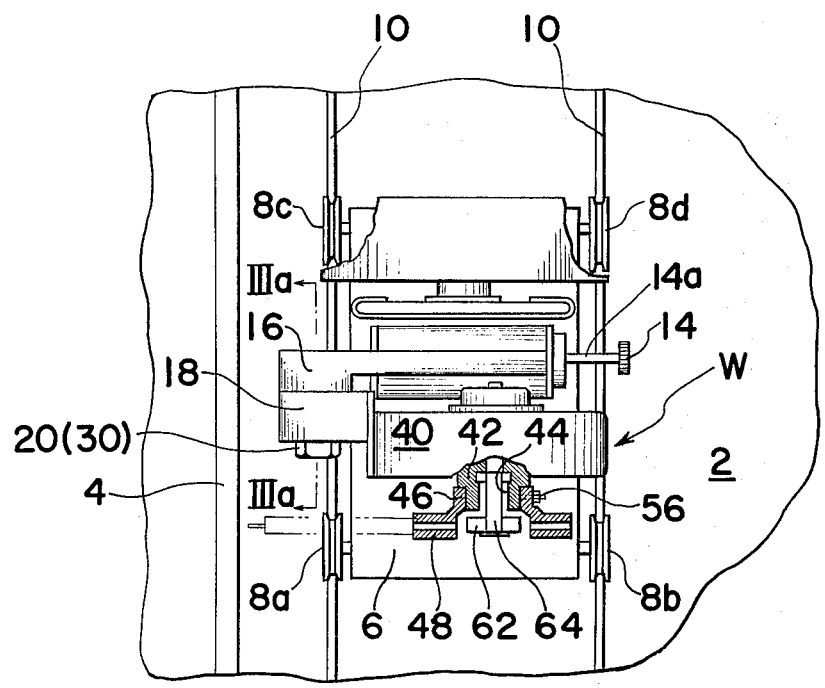
FIG. 2 is a top plan view of the automatic arc welder shown in FIG. 1.

Referring to FIGS. 1 and 2, there is shown a typical automatic arc welder W of the present invention and also a horizontal metal plate 2 placed under the welder W and a vertical metal plate 4 disposed perpendicularly to said plate 2. The welder W shown in FIGS. 1 and 2 has its various parts and components, which will be described later, being adjusted for carrying out a non-positioned fillet welding over butt joint J formed by the horizontal and vertical metal plates 2 and 4.

The welder W of the present invention includes a vehicle or a carrier member 6 having four wheels 8a, 8b, 8c and 8d and being provided with a driving means (not shown) such as motor, air motor or hydraulic motor which is connected to at least one of four wheels through a suitable transmission gears. The four wheels are placed over a pair of rails 10 provided on the horizontal metal plate 2 for moving and guiding the welder W along the butt joint J which forms a line along which the welding is to be effected. Provided on the carrier member 6 is a slider member 12 slidable through suitable corresponding external and internal threads (not shown), which internal thread is formed in the slider member 12 for shifting the slider member 12, upon turning of a dial 14 connected to a shaft 14a having the external thread which engages said internal thread, in a direction perpendicular to the movement of the carrier member 6, as in a commonly used sliding system.

Fixedly provided on the slider member 12 is a first bracket 16 having an arm portion 16a extending towards the vertical metal plate 4, while a second bracket 18 is pivotally provided at an end portion of the arm portion 16a for rotating the second bracket 18 about an axis A in an imaginary plane perpendicular to the movement of the carrier member 6, i.e., the welder W. For fixedly positioning the second bracket 18 in a suitably rotated position, there is provided around the axis A a clamping means 20 which will be described more in detail hereinbelow in connection with FIGS. 3(a) and 3(b).

Referring to FIGS. 3(a) and 3(b), the first bracket 16 has, at end portion of the arm portion 16a thereof, a cylindrical projection 22, while the second bracket 18 has a tubular portion 24 having formed therein with a round opening 26 into which the projection 22 is inserted. The cylindrical projection 22 is integrally or fixedly provided with, at a top thereof, a threaded projection 28 which engages with a nut 30 for tightly holding the second bracket 18 on the first bracket 16 at the suitably rotated position, upon tightening of the nut 30.

Figure 5:
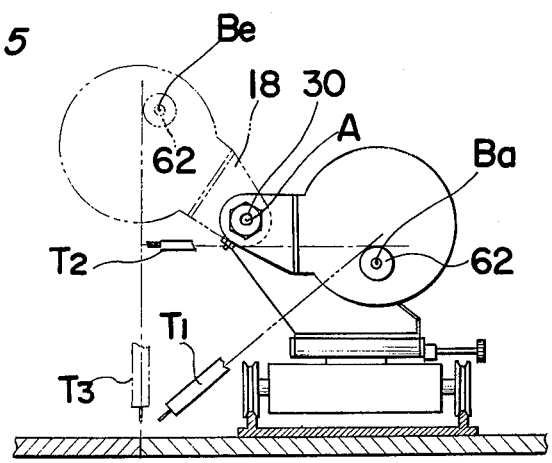
FIG. 5 is a schematic diagram of the automatic arc welder of FIG. 1, particularly showing a movement of the second bracket in relation to the first bracket.

For the purpose of limiting the rotation of the second bracket 18 within a predetermined range, i.e., between a seated position and rotated position, there is provided a detent recess 32 in a form of groove in the cylindrical projection 22 along the circumferential direction in a predetermined length, and a pin projection 34 extended from the tubular portion 24 and inserted into the detent recess 32, thereby defining the degree of rotation of the second bracket 18 about the axis A between the seated position and the rotated position as most clearly seen in FIG. 5, in which the rotated position is shown by an imaginary line.

Referring again to FIGS. 1 and 2, the second bracket 18 is integrally or fixedly provide with a drum shaped supporting frame 40 having formed thereon with a supporting projection 42 which has an opening 44 formed therethrough, as most clearly seen in FIG. 2. Rotatably mounted on the supporting projection 42 is a sleeve portion 46 of a sub-frame 48 for supporting a welding unit and an electrode wire supplying device 50 which comprises a wire straightener 52, a wire feeding device 54 and a welding torch 55. The electrode wire supplying device 50 is rotated about the supporting projection 42 to have the tip end of the welding torch 55 preferably point towards the butt joint J where arc welding is performed. After the electrode wire supplying device 50 has been adjusted to the preferably position, it is tightly held in the adjusted position by means of a clamping screw 56 provided on the sleeve portion 46. An electrode wire 58 which is extracted from a wire supplying drum 60 is preferably straightened and sent towards the butt joint J through the electrode wire supplying device 50 which is described in detail hereinbelow.

The wire straightener 52 of the electrode wire supplying device 50 includes at least three rolls 52a, 52b and 52c rotatably mounted on the sub-frame 48 in such a manner that two rolls 52a and 52b are disposed separately and in alignment with a line along the one side of the pass of the wire, while the roll 52c is positioned on the other side of the pass approximately between the rolls 52a and 52b, whereby the wire drawn out from the wire supplying drum 60 will be straightened after having passed through the rolls 52a, 52b and 52c. The wire 58 which has passed through the wire straightener 52 is transmitted towards the wire feeding device 54 through a suitable guide opening formed in the sub-frame 48.

Figure 4:
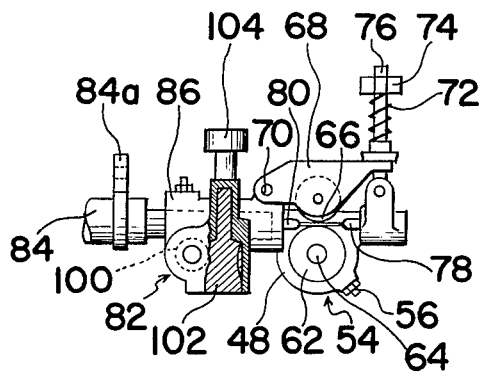
FIG. 4(a) is a fragmentary elevational view, on an enlarged scale, of a electrode wire feeding device and a length adjusting member employed in the welding unit of the welder of FIG. 1.
FIG. 4(b) is a fragmentary top plan view of the length adjusting member employed in the welding unit of the welder of FIG. 1.
FIG. 4(c) is a cross sectional view taken along a line IVc—IVc shown in FIG. 4(b)
FIG. 4(d) is a cross sectional view taken along 15 IV d—IV do show in FIG. 4(b).
Figure 4:
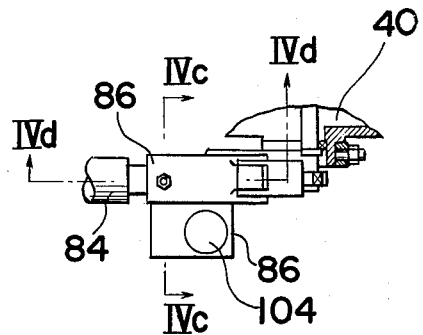
Figure 4:
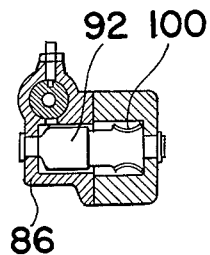
Figure 4:
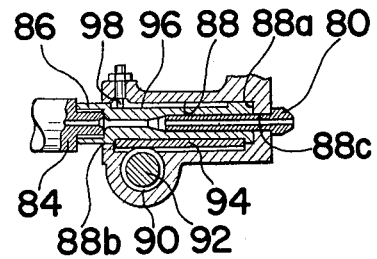

Referring also to FIG. 4(a), the wire feeding device 54 comprising a feed roll 62 which is mounted on a driving shaft 64 extending from the opening 44 and connected to a driving device (not shown) operated by a motor such as air motor or a hydraulic motor incorporated in the supporting frame 40, through a suitable transmission gears. The feed roll 62 is provided at such a position that the line contacting the circumference of the feed roll 62 is in alignment with the pass of the wire 58; more specifically, with one side of the pass of the wire. Provided on the other side of the pass of the wire 58 is a pressure roll 66 rotatably housed in a housing 68 which is pivotally supported at one end portion thereof by a pin 70 on the sub-frame 48. The other end portion of the housing 68 is urged towards the feed roll 62 by a coil spring 72 supported by a suitable nut 74 and bolt 76 extending from the sub-frame 48. Accordingly, the wire 58 fed between the feed roll 62 and the pressure roll 66 is advanced or if necessary retreated along the pass of the wire, upon rotation of the feed roll 62. Provided on the sub-frame 48 at positions along the pass of the wire and adjacent to the place where the feed roll 62 and the supporting roll 66 meet are guide orifice members 78 and 80 each having a through hole formed therein which is large enough for the wire 58 to pass therethrough. Since the axial direction of the through hole in the guide orifice members 78 and 80 are in alignment with each other and yet the imaginary line which coincide with said axial direction substantially lie between the feed roll 62 and the pressure roll 66 at the center thereof, the wire 58 which has dully transmitted to the guide orifice member 78 upon traction of the preceding wire is preferably guided towards the place where the feed roll 62 and the pressure roll 66 meet, and is further guided towards the guide orifice member 80 without any deviation.

The wire 58 which has passed through the guide orifice member 80 is led towards the welding torch 55 comprising a length adjusting member 82 integrally or fixedly provided on the sub-frame 48 for adjusting the length of a torch tube 84 and said torch tube 84 having a through hole formed therethrough in the axial direction thereof with one end portion inserted into the length adjusting member 82 and the other end left open for projection of the tip of the wire 58. The mechanism for the length adjusting member 82 is described more in detail hereinbelow.

Referring to FIGS. 4(a), 4(b), 4(c), and 4(d), the length adjusting member 82 of FIG. 1 is enlarged and is partly broken to show the internal structure thereof as well as the manner in which the length adjusting member 82 and the torch tube 84 are assembled.

The length adjusting member 82 has a housing 86 which is integrally or fixedly formed with the sub-frame 48. The housing 86 has formed therein with an elongated cylindrical opening 88 having its axis being in alignment with the pass of the wire 58, with one end 88a of the cylindrical opening 88 being partially closed or narrowed to form a through hole 88c while the other end 88b is completely opened for receiving therein said one end portion of the torch tube 84 from the open end 88b, as most clearly seen in FIG. 4(d). It is to be noted that the torch tube 84 shown in FIG. 4(d) is in its most inserted position, and that an electric power is supplied thereto through a terminal 84a provided adjacent to the length adjusting member 82.

Also formed in the housing 86 at a position adjacent to the open end 88b is another cylindrical opening 90 having its axis extended perpendicularly to the axis of the former cylindrical opening 88. Since the axis for the cylindrical opening 88 is in separated relation to the axis of the cylindrical opening 90 by a distance slightly smaller than a sum of radii of the cylindrical openings 88 and 90, the openings 88 and 90 are connected to each other at place where the cylindrical opening 88 overlaps or coincides with the cylindrical opening 90. Rotatably provided in the cylindrical opening 90 is a pinion 92 which engages with a rack 94 provided on a peripheral surface along the axial direction of the torch tube 84 at said one end portion thereof. As is apparent to those skilled in the art, the rotation of the pinion 92 advances or retreats the insertion of the torch tube 84 into the cylindrical opening 88. For the purpose of preventing the torch tube 84 from rotating about its axis, there is provided a groove 96 on the peripheral surface along the axial direction of the torch tube 84 at said one end portion thereof and preferably on the opposite side to the side where the rack 94 is provided, and also provided a pin projection 98 inwardly extending into the cylindrical opening 88 for engaging said pin projection 98 slidingly with said groove 96. For rotating the pinion 92, there is provided a worm gear 100 integrally formed with the pinion 92, which worm gear 100 is engaged with another worm 102 provided perpendicularly to the worm gear 100. It should be noted that these worm gear 100 and worm 102 are housed in the housing 86 and that the worm 102 is provided with a handle 104 on a shaft thereof, which is extended outwardly from the housing 86. Accordingly, the torch tube 84 can be elongated or shortened, upon rotation of the handle 104, to adjust the length of the torch tube 84 to an optimum length.

It should be noted that the length adjusting member 82 as described above can be coupled with a slider member for displacing the torch tube 84 in a direction perpendicular to the direction of movement of the welder W.

Referring now to FIG. 5, there is shown a schematic diagram for the automatic arc welder W of the present invention, in which only the tip portion of the torch tube 84 is shown for the sake of brevity of the drawings and the torch tube 84 as well as the second bracket 18 are shown to be placed in different places in accordance with different situations in proceeding the welding in various types, such as non-positioned fillet welding, horizontal welding or flat positioned welding. Each of the situations is described in detail hereinbelow.

In proceeding the non-positioned fillet welding or horizontal welding, the second bracket 18 together with the supporting frame 40 is rotated about the axis A, upon loosening the nut 30, to have the bracket 18 terminate in the seated position, in which position as is apparent from FIG. 5, the feed roll 62 has its axis positioned at a point Ba, while on the other hand, in proceeding the flat positioned welding, the second bracket 18 together with the supporting frame 40 is rotated about the axis A to have the bracket 18 terminate in the rotated position, in which position as is apparent from FIG. 5, the feed roll 62 has its axis positioned at a point Be. Since the range or length of the detent recess 32 having formed around the circumferential direction of the cylindrical projection 22 is limited to a predetermined degree, the positioning of the second bracket 18 in the seated position or in the rotated position can be obtained in such an easy manner that the second bracket 18 is rotated about the axis A until the pin projection 34 engages with one or the other end of the detent recess 32. After having the second bracket 18 rotated to either one of the seated or rotated position, the nut 30 is threaded in for tightly clamping the second bracket 18 in the required position.

When proceeding the non-positioned fillet welding, the second bracket 18 is rotated to terminate, together with the supporting frame 40, in the seated position, at which it is tightly clamped by the nut 30 in the manner described above. Then, the clamping screw 56 is loosened to rotate the electrode wire supplying device 50 about the axis Ba to bring the torch tube 84 thereof in a position $T_1$ as shown in FIG. 5. Then again, the clamping screw 56 is tightened to maintain the torch tube 84 in the position $T_1$.

After having arranged the torch tube 84 in the position described above, the automatic arc welder W is moved along the rails 10, while the wire 58 is extracted from the wire supplying drum 60 and fed towards the welding portion in an optimum speed.

It should be noted that, in non-positioned fillet welding, the pointing direction of the torch tube 84, i.e., the wire 58 and/or the distance between the tip of the torch tube 84 and the portion to be welded may affect the welding result in considerable degree with respect to the condition of the portion to be welded. In such a case where the pointing direction of the torch tube 84 affects the welding result, the clamping screw 56 is loosened and the electrode wire supplying device 50 is rotated about the axis Ba to have the torch tube 84 set in optimum angle and then again the clamping screw 50 is tightened to hold the torch tube 84 in said optimum angle. If necessary, it is possible to adjust the pointing direction of the torch tube 84 by rotating the second bracket 18 which is now placed in the seated position, slightly towards the rotated position about the axis A. In such a case where the distance between the tip of the torch tube 84 and the portion to be welded affects the welding result, for example due to change in the length of the wire extending from the tip of the torch tube 84, the handle 104 of the length adjusting member 82 is turned to elongate or shorten the length of the torch tube 84 to an optimum length in the manner described earlier.

It should be noted that the positioning of the torch tube 84 in the optimum position for non-positioned welding, as well as for the other weldings can be adjusted precisely by shifting the slider member 12 together with the torch tube 84 in direction perpendicular to the direction of the movement of the welder W.

Accordingly, by adjusting any one of or in combination of the second bracket 18, the electrode wire supplying device 50, the length adjusting member 82 and/or the slider member 12, the torch tube 84 can be positioned in any desirable positions for proceeding with the non-positioned fillet welding or other weldings.

When proceeding with the horizontal welding, the second bracket 18 is rotated about the axis A in the seated position as is positioned for proceeding with the non-positioned fillet welding described above. Then, the clamping screw 56 is loosened to rotate the electrode wire supplying device 50 about the axis Ba to have the torch tube 84 to set in a horizontal position $T_2$ which is in parallel relation to the direction of the movement of the welder W, after which, the clamping screw 56 is tightened for securing the torch tube 84 in said horizontal position. In proceeding with the horizontal welding, it is necessary to adjust the distance between the tip of the torch tube 84 and the portion to be welded. Such adjustment can be carried out by adjusting the length adjusting member 82 or the slider member 12.

When it is necessary to change or adjust the height of the torch tube 84 for carrying out the horizontal welding in higher position, the second bracket 18 is rotated about the axis A to raise the electrode wire supplying device 50 together with the supporting frame 40. For the purpose of lowering the height of the torch tube 84 for carrying out the horizontal welding in lower position, the second bracket 18 described as position in the seated position can be further rotated in a clockwise direction from the seated position, so as to bring the supporting frame 40 together with the electrode wire supplying device in a hanging position from the axis A, whereby the torch tube 84 can be further lowered.

When proceeding with the flat positioned welding, the second bracket 18 is rotated to terminate, together with the supporting frame 40, in the rotated position at which it is tightly held by the nut 30 in the manner described before. Then, the clamping screw 56 is loosened to rotate the electrode wire supplying device 50 about the axis Be to bring the torch tube 84 thereof in a position $T_3$ as shown in FIG. 5. Then again, the clamping screw 56 is tightened to maintain the torch tube 84 in the position $T_3$.

After having arranged the torch tube 84 in the position $T_3$ described above, the automatic arc welder W is moved along the rails 10, while the wire 58 is drawn from the wire supplying drum 60 and fed towards the welding portion in an optimum speed.

It should be noted that the adjustment for positioning the torch tube 84 in an optimum position for this case is carried out by the length adjusting member 82 and the slider 12.

Accordingly, the automatic arc welder W of the present invention can be applied in proceeding various types of weldings such as those described above without having any replacement of the parts for the welder W, while in proceeding with each welding, the precise adjustment for the torch tube 84 in their optimum position can be achieved by various adjusting means without any difficulty.

The foregoings is particularly directed to those welder W which adopts the rails 10 to have the welder W to be guided in parallel relation to the line of weld. However, especially in a case where there is an erecting wall member extending in parallel relation to the line of weld and erected perpendicularly to the plane on which the welder W travels, as those wall members 2 or 106 shown in FIGS. 6(a) and 6(b), it is possible, instead of using the rails, to have the welder W to be guided in parallel relation to the line of weld by using a pair of guiding arms fixedly and projectingly provided at front and rear end portions of the carrier member 6 towards the erecting wall member. Such guiding arms are described in detail hereinbelow.

Figure 6:
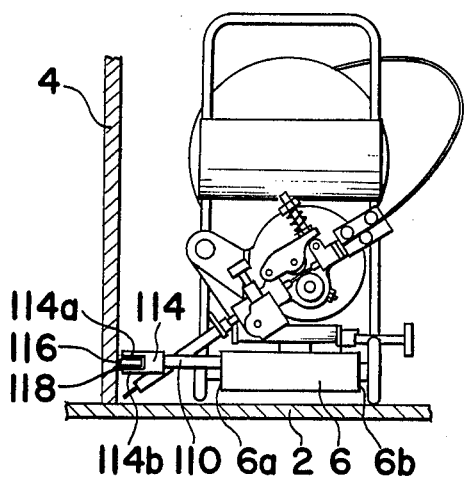
FIG. 6(a) is a similar view to FIG. 1, but particularly shows another embodiment thereof.
FIG. 6(b) is a similar view to FIG. 6(a), but particularly shows a modification thereof.
Figure 6:
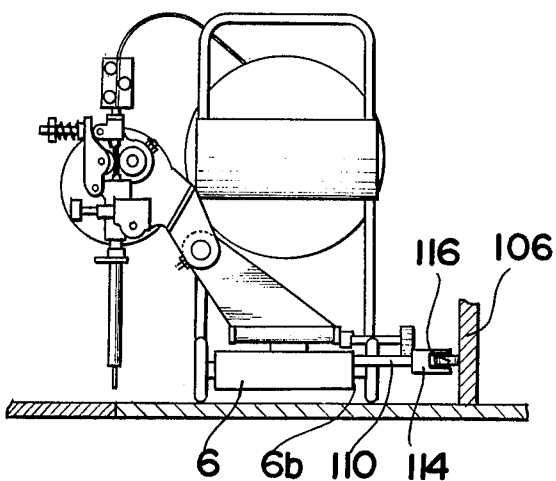

Referring to FIGS. 6(a), the automatic arc welder W of the present invention is placed directly against the vertical metal plate 4, and there is provided a first guiding arm 110 laterally extending and fixedly mounted on the carrier member 6 at a side 6a and in the front portion thereof. The first guiding arm 110 has formed, fixedly or integrally at its projecting end, with a U-shaped member 114 in which two spaced extending arms 114a and 114b are disposed in such a manner that their side faces are in parallel with an imaginary plane perpendicular to the direction of the movement of the welder W, and that the arms 114a and 114b are extended outwardly from the welder W. Provided between the two arms 114a and 114b is a disk shaped guide roll 116 rotatably mounted on a pin 118 extended between the two arms 114a and 114b. It should be noted that the guide roll 116 may be replaced by a ball shaped guide roll instead of disk shaped guide roll.

Still referring to FIG. 6(a), the automatic arc welder W of the present invention is further provided with another guiding arm, namely a second guiding arm (cannot be seen) projectingly and fixedly mounted on a carrier member 6 at the same side 6a as that provided with the first guiding arm 110 and in the rear portion thereof. The second guiding arm having the same length as that of the first guiding arm 110 also has the U-shaped member and the guide roll in the same manner as those provided on the first guiding arm 110. Since these two first and second guiding arms are provided on the same side 6a of the carrier member 6 and have the same extending length, the guide roll provided at the end of each guiding arm may slidingly roll over the vertical metal plate 4, so that during the travel of the welder W, the distance between the vertical metal plate 4 and the welder W can be maintained in predetermined distance. In other words, the welder W may travel in parallel relation to the face of the vertical metal plate 4 and accordingly, in parallel relation to the line of weld.

Although the welder W of the type described above may not move towards the vertical metal plate 4 during its travel any closer than the distance determined by the guiding arms, the welder W may further be separated or moved away from the vertical metal plate 4, thus, it is necessary to provide means for preventing the welder W to move away from the vertical metal plate 4. For this purpose, the driving means for driving the wheel 8a, 8b, 8c and/or 8d is arranged in such a manner that the wheel 8b or 8d provided away from the vertical metal plate 4 is driven faster than the wheel 8a or 8c provided adjacent to the vertical metal plate 4, so that the welder W itself is urged towards the vertical metal plate 4, thus, the welder W being prevented from moving away from the vertical metal plate 4.

It should be noted that the preventing means described as employed in the driving means can be employed in the welder W in other components than the driving means, for example, in the four wheels or in the first and second guiding arms. In the case where the preventing means is employed in the four wheels, the four wheels are arranged in such a manner that the two front wheels 8a and 8b may be turned towards the vertical metal plate 4 or that the two side wheels 8a and 8c may be arranged to have the diameter thereof smaller than that of the wheels 8b and 8d, for urging the welder W towards the vertical metal plate 4, while the first and second guiding arms keep the welder W in separated relation from the vertical metal plate 4, thus preventing the welder W from moving away from the vertical metal plate 4. On the other hand, in the case where the preventing means is employed in the first and second guiding arms, the first and second guiding arms are arranged in such a manner that the length of the first guiding arm 110 provided in front may be shorter than that of the second guiding arm, for urging the welder W towards the vertical metal plate 4. It is possible to employ the preventing means in other components than those described above as long as the welder W can be urged towards the vertical metal plate 4 by said preventing means.

It should be noted that the first and second guiding arms described as provided fixedly or integrally on the side 6a of the carrier member 6, can be provided detachably on the side 6a with the length of extending arm arranged variably for changing the distance between the vertical metal plate 4 and the welder W, and that the first and second guiding arms can be detachably provided on the other side 6b of the carrier member 6 in the similar manner as is shown in FIG. 6(b) for performing the flat positioned welding.

It should also be noted that in the case where the welder W is provided with said guiding arms on the other side 6b of the carrier member 6, as shown in FIG. 6(b), the welder W is urged towards the vertical metal plate 106.

Since the automatic arc welder W described in connection with FIGS. 6(a) and 6(b) has formed therein with guiding arms, the welder W can be set to perform the welding operation without preparation for railing which often takes much time.

Furthermore, since the positioning of the torch tube 84 provided in the welder W is in strict compliance with the demand of the operator, it is possible to change the positions for the torch tube 84, thus enabling various types of welding such as non-positioned fillet welding, flat positioned welding or horizontal welding.

As for the welder W which is available for traveling on the rails 10 or for traveling directly on the horizontal metal plate 2, the wheels thereof should not be turned nor in different sizes in the diameter as in those described above, but should preferably have the wheels arranged all in the same size and arranged to rotate in the same direction. Instead of arranging the preventing means in the wheels, such type of welder should preferably have the preventing means arranged in the guiding arms in which the first guiding arm 110 provided at front portion of the carrier member 6 is shorter than the second guiding arm provided at the rear portion of the carrier member.

Although the present invention has fully been described with reference to the accompanying drawings, it is to be noted that various changes and modifications are apparent to those skilled in the art. For example, the clamping means 20 described earlier in connection with FIGS. 3(a) and 3(b) may take different embodiments which are described hereinbelow.

Figure 7:
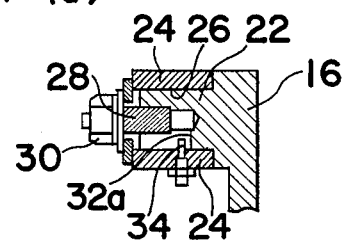
Figure 7:
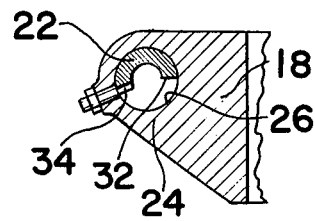

Referring to FIGS. 7(a) and 7(b), there is shown a first modification for the clamping means 20 in which the detent recess 32a described as provided in the form of groove is completely cut off up to the projecting end of the cylindrical projection of the first bracket 16 so as to simplify the manufacturing process for the cylindrical projection and to simplify the insertion of the cylindrical projection into the round opening formed in the tubular portion 24 of the second bracket 18.

Figure 8:
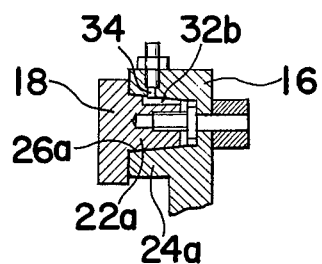
Figure 8:
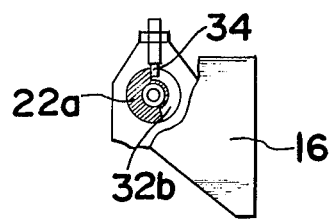

Referring to FIGS. 8(a) and 8(b), there is shown a second modification for the clamping means 20 in which the cylindrical projection 22a described as provided on the first bracket 16 is provided on the second bracket 18, while the tubular portion 24a forming round opening 26a is provided on the first bracket 16. It should be noted that the pin projection 34 is provided on the tubular portion 24a, while the detent recess 32b is provided in the cylindrical projection 22a. It should also be noted that the cylindrical projection 22a as well as the round opening 26a are preferably formed in a shape of taper for easy insertion of the cylindrical projection 22a and for securing a rigid clamp between the cylindrical projection 22a and the tubular portion 24a.

Figure 9:
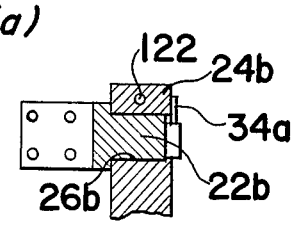
Figure 9:
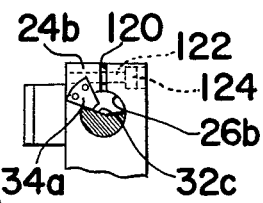

Referring to FIGS. 9(a) a) and 9(b), there is shown a third modification of the clamping means 20 in which the tubular portion 24b provided on the first bracket 16 has a slit 120 formed in alignment with the longitudinal direction of the round opening 26b and has an elongated opening 122 formed in a direction across the slit 120 for inserting therein a clamping screw 124 which, upon threading in of the screw 124, narrows the width of the slit 120 for clamping the cylindrical projection 22b inserted into the round openings 26b. It should be noted that the detent recess 32c for this third modification is provided at the end of the cylindrical projection 22b while the pin projection 34a which engages with the detent recess 32c is detachably provided on the side face of the tubular portion 22b, as clearly seen in FIGS. 9(a) and 9(b).

Figure 10:
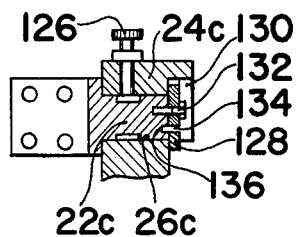
Figure 10:
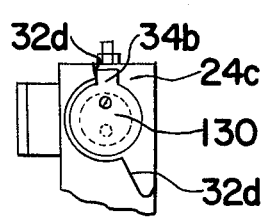

Referring to FIGS. 10(a) and 10(b), there is shown a fourth modification of the clamping means 20 in which the tubular portion 24c provided on the first bracket 16 has a clamping screw 126 engaging with a peripheral face of the cylindrical projection 22c, whereby the cylindrical projection 22c is tightly held in the round opening 26c. It should be noted that the detent recess 32d for this fourth modification is provided on the side face of the tubular portion 24c, while the projection 34b for engagement with the detent recess 32d is detachably provided at the end face of the cylindrical projection via a suitable separation ring 128. The projection 34b, in this fourth modification is provided in a form of disk, having a convexed portion namely the detent recess 32d with a suitable width, as shown in FIG. 10(b). Since the disk 130 provided on the end face of the cylindrical projection 22c is positioned with two engagements, i.e., one of which is engaged with a securing screw 132, while the other of which is engaged with a suitable projection 134 into a recess 136, the disk may not be slidingly displaced in its position with respect to the end face of the cylindrical projection.

In the case where the pin projection 34a or the projection i.e., the disk 130 is detachably provided, it is possible to vary the degree of limitation of the rotation of the second bracket 18 about the axis A without difficulty by merely changing the pin projection 34a or disk 130 having different width of the projection or the convexed portion.

The description hereinbelow is now directed to the modifications for the second bracket 18 and the supporting frame 40 which supports the electrode wire supplying device 50 as well as the driving means for driving the feed roll 62 formed in the electrode wire supplying device 50.

Referring to FIG. 11, the second bracket 18 is integrally or fixedly provided with a ring shaped frame member 140 forming an circular opening therein, and having a slit 142 formed preferably at the opposite side of the ring where it is connected with the first bracket 16 in a radial direction with respect to the circular opening. On both side of the slit 142 and on outer peripheral face of the ring shaped frame member 140, there is provided a projecting member 144 having formed therein with a through-hole extending in a direction across the slit 142, in which through-hole, there is inserted a clamping bolt 146 coupled with a nut 148.

Fitly supported in the circular opening is a drum shaped supporting frame 40a which may rotate in the circular opening when the bolt 146 is loosened to have the slit 142 opened in comparatively large width, while, in the other hand, the drum shaped supporting frame 40a may be tightly clamped in the circular opening when the bolt 146 is threaded into the nut 148 to have the slit 142 closed in comparatively narrow width. Accordingly, instead of rotating the electrode wire supplying device 50 about the axis Ba or Be, the electrode wire supplying device 50 can be rotated together with the supporting frame 40a within the ring-shaped frame member 140. Thus, the electrode wire supplying device 50, more particularly, the torch tube 84 can be rotated to the optimum position desired.

Referring to FIG. 12, the second bracket 18a itself is formed in an elongated rectangular plate shape in which one end thereof is engaged with the first bracket 16b in the same manner as described earlier in connection with FIGS. 3(a) and 3(b), while the other end thereof is engaged with the supporting frame 40b formed in a rectangular shape, in a similar manner to those engagements between the first and second brackets. Therefore, the electrode wire supplying device 50 can be rotated to the optimum position desired. It should be noted that the second bracket 18a in this modification described as formed in the elongated rectangular plate shape can be formed in any other desired shape.

Referring to FIG. 13, there is shown an example for one usage of the automatic arc welder W, in which the carrier member (not shown) is placed on a beam (not shown) which is positioned a step higher than the horizontal metal plate 2 and extended along the line of weld, so that the welding can be performed as the welder W travels on the beam. Such positioning of the welder W is particularly suitable when it is necessary to carry the welding on both side of the butt joint which is formed between the two metal plates, i.e., the horizontal metal plate 2 and the vertical metal plate 4, provided that the two metal plates arranged in a form of "T", and that the height of the vertical metal plate 4 is smaller or approximately equal to the height of said step, in other words, within a reach of extended electrode wire supplying device 50, as shown in FIG. 13. After having positioned the welder W as such, and having extended the second bracket 18a and the electrode wire supplying device 50 in a position shown by a real line, one side of the butt joint is welded through non-positioned fillet welding, as the welder W travels along the beam, while in turn, the other side of the butt joint is welded in a similar manner, during which the second bracket 18a and the electrode wire supplying device are extended in a position shown by an imaginary line.

Since it is not necessary to replace the welder W from one side to the other side of the vertical metal plate 4, the welding described above can be carried out with less adjustments and with high efficiency.

Furthermore, since the conditions of the welded portions on both side may result in an approximately equal condition, the strength of the welded line on one side of the butt joint may balance with that of the other side.

As is described by way of examples with reference to the accompanying drawings, the automatic arc welder W of the present invention can be applied in performing various types of weldings, since the electrode wire supplying device can be set to position in any desired angle in different places. Therefore, the automatic arc welder W of the present invention is applicable to wide use.

It is to be understood that the forms of this invention herewith shown and described are to be taken as preferred embodiments. Various changes may be made in the shape, size and arrangement of the parts. For example, equivalent elements may be substituted for those illustrated and described herein, parts may be reversed, and certain features of the invention may be utilized independently of the use of other features, all without departing from the scope of this invention as defined in the subjoined claims.

What is claimed is:

1. An automatic arc welder capable of performing various types of weldings such as non-positioned fillet welding, horizontal welding and flat positioned welding, through continuous feeding of electrode wire extracted from a wire drum onto a joint formed between two metal plates, said automatic arc welder comprising;
   a. a carrier member having means for traveling said carrier member along the joint;
   b. a first bracket mounted on said carrier member, said first bracket having formed therein a support at an end portion thereof;
   c. a second bracket having formed therein a coupling member for rotatably coupling said second bracket onto said support of said first bracket for rotating the second bracket on an imaginary plane perpendicular to the movement of the carrier member;
   d. a first clamping means for tightly clamping said second bracket with respect to said first bracket at a predetermined rotated position;
   e. a welding unit including an electrode wire feeding member for continuously feeding electrode wire extracted from the wire drum and a welding torch for guiding a tip end of said electrode wire towards an end of and further outside of said welding torch, said welding unit rotatably supported with respect to said second bracket on said imaginary plane for changing directing direction of said welding torch; and
   f. a second clamping means for tightly clamping said welding unit with respect to said second bracket at predetermined rotated position, whereby tip end of said welding torch, upon rotation of said second bracket into said first described predetermined position with respect to said first bracket and upon rotation of said welding unit into said latter described predetermined position with respect to said second bracket, can be positioned adjacent to said joint and can be directed towards the joint for effecting said various types of weldings.

2. An automatic arc welder as claimed in claim 1, wherein said traveling means are at least three wheels.

3. An automatic arc welder as claimed in claim 2 further comprising a first driving means for driving at least one of said wheels having formed in said carrier member.

4. An automatic arc welder as claimed in claim 2, further comprising a guiding means coupled to said carrier member for guiding said automatic arc welder along said joint in parallel relation.

5. An automatic arc welder as claimed in claim 4, wherein said guiding means is a track extended along the joint in parallel relation thereto for engaging said wheels thereon.

6. An automatic arc welder as claimed in claim 4, wherein said guiding means is a pair of bars provided on one side of said carrier member and disposed, respectively, at front and rear end portions of said one side, and extended outwardly from the carrier member towards a metal plate which is erected upwardly for separating said automatic arc welder from said erected metal plate in a predetermined distance.

7. An automatic arc welder as claimed in claim 1 further comprising a slider member employed between said carrier member and said first bracket for slidingly displacing said first bracket in relation to said carrier member in a direction perpendicular to the direction of movement of said carrier member.

8. An automatic arc welder as claimed in claim 7, wherein said slider member is a pair of gears each mounted in said carrier member and in said first bracket.

9. An automatic arc welder as claimed in claim 1 further comprising a welding torch length adjusting means for adjusting the length of welding torch in an axial direction thereof.

10. An automatic arc welder as claimed in claim 1, further comprising means for determining the rotation of said second bracket about the support of said first bracket between a seated position and a rotated position.

11. An automatic arc welder as claimed in claim 10, wherein either one of said support formed in said first bracket and said coupling member formed in said second bracket is a cylindrical projection having its axis extended in alignment with the direction of movement of said carrier member.

12. An automatic arc welder as claimed in claim 11, wherein other one of said coupling member formed in said second bracket and said support formed in said first bracket is an round opening for rotatably receiving said cylindrical projection.

13. An automatic arc welder as claimed in claim 12, wherein said first clamping means is a nut to be threaded into said cylindrical projection from top portion thereof for urging said second bracket onto said first bracket through peripheral edge of head portion of said nut.

14. An automatic arc welder as claimed in claim 12, wherein said determining means is a combination of detent recess and a projection, each provided in said cylindrical projection and said round opening, respectively.

15. An automatic arc welder as claimed in claim 1, wherein said electrode wire feeding member including a pair of juxtaposed rolls.

16. An automatic arc welder as claimed in claim 15 further comprising a second driving means for driving at least one of said pair of juxtaposed rolls.

17. An automatic arc welder as claimed in claim 1 further comprising a frame member fixedly connected to said second bracket for rotatably mounting thereon said welding unit.

18. An automatic arc welder as claimed in claim 1 further comprising a frame member for fixedly supporting said welding unit thereon, said frame member rotatably connected to said second bracket for rotating said welding unit with respect to said second bracket.

19. An automatic arc welder as claimed in claim 18, wherein said second bracket is formed in a shape of an elongated plate member in which one end portion thereof is rotatably connected to said first bracket and the other end portion thereof is rotatably connected to said frame member by a pin projection provided on said other end portion of said second bracket.

20. An automatic arc welder as claimed in claim 18, wherein said frame member is formed in a shape of drum.

21. An automatic arc welder as claimed in claim 20, wherein said second bracket is formed with a ring shaped frame having formed therein a circular opening for rotatably receiving therein said drum shaped frame member.

22. An automatic arc welder as claimed in claim 21, wherein said second clamping means is diminishing means for diminishing the size of opening formed in said ring shaped frame.

23. An automatic arc welder as claimed in claim 22, wherein said diminishing means is a slit formed in said ring shaped frame said slit having an engaging means for engaging two edges of opposite sides of said slit to narrow the separation of said slit.

* * * * *